(12) United States Patent
Ren et al.

(10) Patent No.: US 11,656,039 B2
(45) Date of Patent: May 23, 2023

(54) TUBULAR HEAT EXCHANGER AND PACKAGING METHOD OF TUBULAR HEAT EXCHANGER

(71) Applicants: Tsinghua University, Beijing (CN); HON HAI PRECISION INDUSTRY CO., LTD., New Taipei (TW)

(72) Inventors: Jian-Xun Ren, Beijing (CN); Jun-Hong Hao, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/490,089

(22) Filed: Sep. 30, 2021

(65) Prior Publication Data

US 2022/0187032 A1    Jun. 16, 2022

(30) Foreign Application Priority Data

Dec. 16, 2020    (CN) .......................... 202011493212.X

(51) Int. Cl.
*F28F 9/02*    (2006.01)
*B23P 15/26*    (2006.01)
*F28F 9/10*    (2006.01)

(52) U.S. Cl.
CPC .............. *F28F 9/0224* (2013.01); *F28F 9/10* (2013.01); *B23P 15/26* (2013.01); *F28F 2230/00* (2013.01)

(58) Field of Classification Search
CPC ........ F28F 9/0224; F28F 9/10; F28F 2230/00; F28F 9/0221; F28F 9/0226; F28F 9/0248; F28F 9/26; F28F 9/002; F28F 1/02; F28F 9/013; F28F 2275/02; B23P 15/26; F28D 1/05316; F28D 7/16; F28D 1/02
See application file for complete search history.

(56) References Cited

U.S. PATENT DOCUMENTS

| 4,623,017 A | 11/1986 | Oda et al. |
| 5,323,849 A | 6/1994 | Korczynski, Jr. et al. |
| 2005/0178525 A1 | 8/2005 | Pierce et al. |

FOREIGN PATENT DOCUMENTS

| JP | H06207795 | 7/1994 |
| JP | H07120187 | 5/1995 |
| JP | 2015068574 | 4/2015 |
| KR | 101067692 | 9/2011 |
| WO | 2005019757 | 3/2005 |

*Primary Examiner* — Lee A Holly
(74) *Attorney, Agent, or Firm* — ScienBiziP, P.C.

(57) ABSTRACT

A tubular heat exchanger includes an upper tube plate box, a lower tube plate box, a plurality of heat exchange tubes, and a pressure bolt. Each heat exchange tube includes an inlet end and an outlet end opposite to the inlet end, the inlet end passes through the upper tube plate box, the outlet end passes through the lower tube plate box, the first sealing rubber is filled in a gap between the plurality of heat exchange tubes and the upper tube plate box, and the second sealing rubber is filled in a gap between the plurality of the heat exchange tubes and lower tube plate box. The pressure bolt is located between the upper tube plate box and the lower tube plate box. The present application also relates to a packaging method of the tubular heat exchanger.

6 Claims, 3 Drawing Sheets

```
┌─────────────────────────────────────────────────────────────┐
│ provide an upper tube plate box, a lower tube plate box, and│
│ a plurality of heat exchange tubes, wherein the upper tube  │
│ plate box defines multiple openings, the lower tube plate box│─S1
│ defines multiple openings, and the plurality of heat exchange│
│ tubes pass through the openings of the upper tube plate box │
│ and the lower tube plate box                                │
└─────────────────────────────────────────────────────────────┘
                              │
                              ▼
┌─────────────────────────────────────────────────────────────┐
│ filling the upper tube plate box and the lower tube plate box│
│ with liquid sealing rubber, wherein the liquid sealing rubber│
│ is filled in the gap between the heat exchange tube and the │
│ upper tube plate box, the liquid sealing rubber is also filled in│─S2
│ the gap between the heat exchange tube and the lower tube   │
│ plate box, and then the liquid sealing rubber is solidified, so│
│ that multiple heat exchange tubes are sealed and fixed in the│
│ upper tube plate box and the lower tube plate box           │
└─────────────────────────────────────────────────────────────┘
                              │
                              ▼
┌─────────────────────────────────────────────────────────────┐
│ installing the pressure bolts on the upper tube plate box and│
│ the lower tube plate box to apply and adjust the sealing    │─S3
│ pressure                                                    │
└─────────────────────────────────────────────────────────────┘
```

FIG. 3

TUBULAR HEAT EXCHANGER AND PACKAGING METHOD OF TUBULAR HEAT EXCHANGER

FIELD

The present application relates to a tubular heat exchanger and a packaging method of the tubular heat exchanger.

BACKGROUND

Tubular heat exchangers are widely used in the fields of coking industry, metallurgy, chemical industry, hazardous waste incineration system, boiler industry, waste heat recovery system, and urban sewage treatment, etc. Tubular heat exchangers are usually used in a harsh environment, the working temperature and pressure of the heat exchange medium are relatively high, and the use environment has certain corrosiveness, which requires the packaging process between the heat exchange tubes of the tubular heat exchanger and the tube plate to have high performance indicators.

The connection methods between heat exchange tube and tube plate mainly includes expansion joint, welding, explosion connection, and expansion welding connection, etc. Different connection methods will affect the connection quality of heat exchange tube and tube plate. On the one hand, with the equivalent diameter of heat exchange tube decreases (such as less than 1 mm) and tube wall becomes thinner (such as less than 0.1 mm), the above-mentioned connection method will cause the tube wall of the heat exchange tube to rupture, and some connection methods are easy to block the heat exchange tube, which is time-consuming and laborious to process. It is difficult to achieve large-scale processing, and the expansion method is not suitable for the connection of non-circular heat exchange tubes (such as elliptical tubes, drop-shaped tubes) and tube plates. On the other hand, for tubular heat exchangers used in special occasions (such as strong corrosiveness, etc.), when using non-metallic heat exchange tubes, the welding method or the expansion method is no longer applicable, and improper processes will affect the use and lifespan of the heat exchanger.

Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 3 shows a flowchart of a packaging method of the tubular heat exchanger of one embodiment according to the present disclosure.

DETAILED DESCRIPTION

Figure 1:
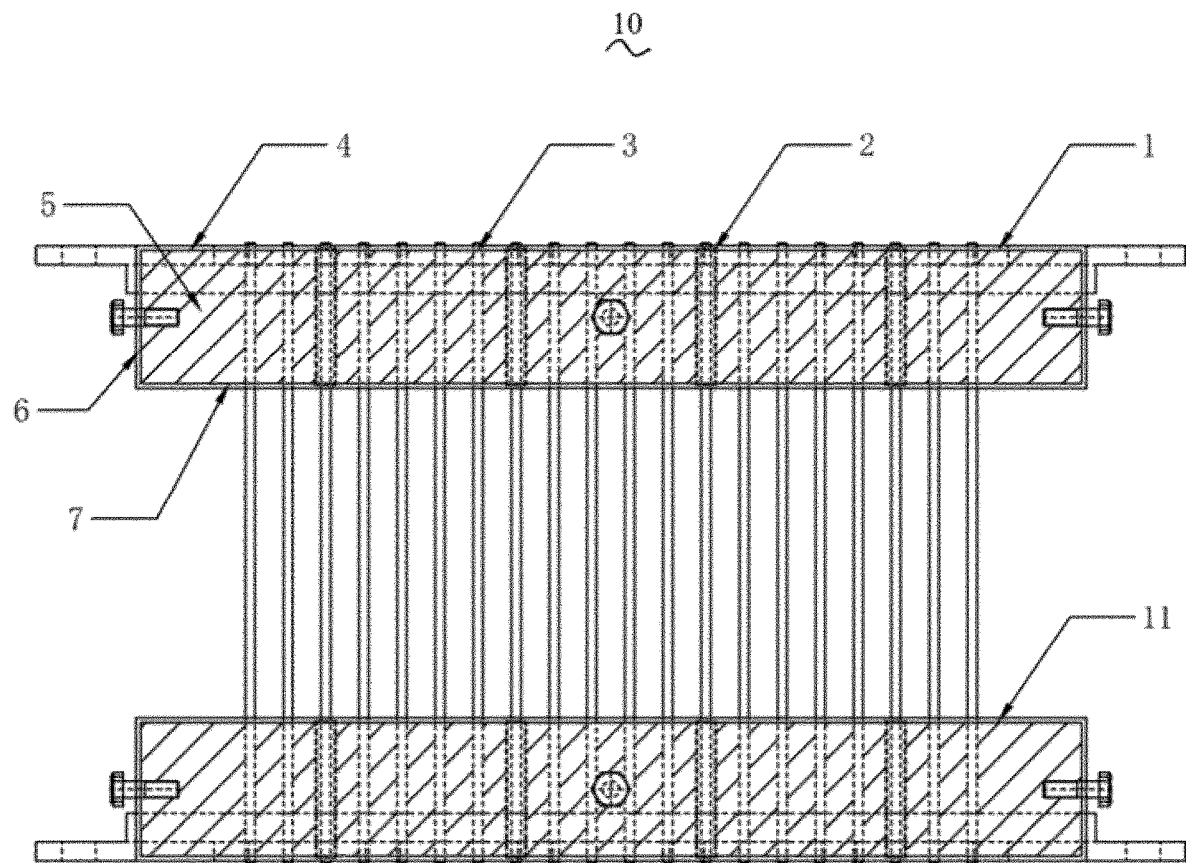
FIG. 1 shows a schematic cross-sectional view of a tubular heat exchanger of one embodiment according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated better illustrate details and features. The description is not to be considered as limiting the scope of the embodiments described herein.

The term "outside" refers to a region that is beyond the outermost confines of a physical object. The term "inside" indicates that at least a portion of a region is partially contained within a boundary formed by the object. The term "substantially" is defined to essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

Figure 2:
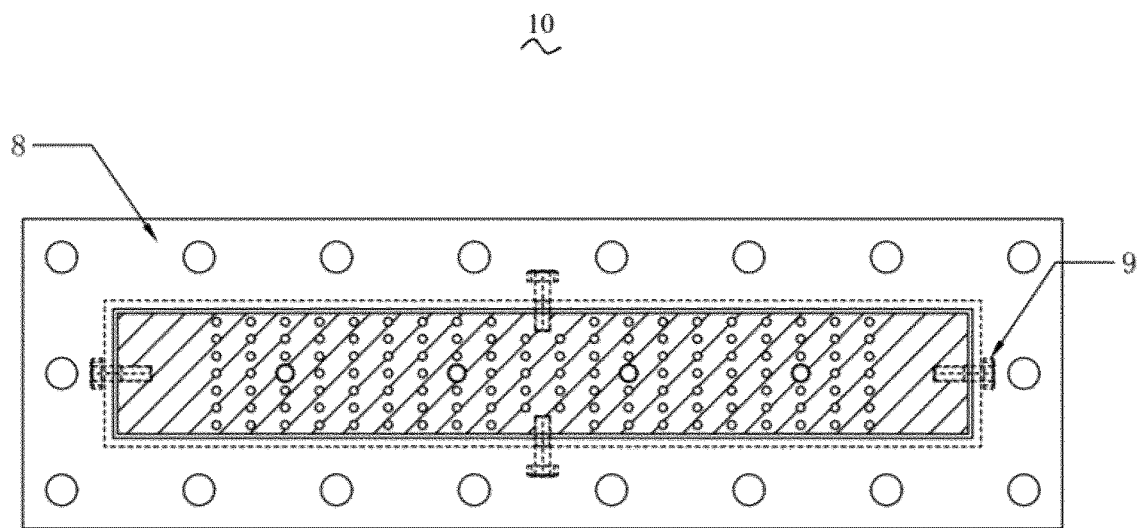
FIG. 2 shows a schematic top view of the tubular heat exchanger of one embodiment according to the present disclosure.

Referring to FIGS. 1 and 2, a tubular heat exchanger 10 is provided. The tubular heat exchanger 10 includes an upper tube plate box 1, a lower tube plate box 11, and a plurality of heat exchange tubes 3. Each of the plurality of heat exchange tubes 3 includes an inlet end and an outlet end. The inlet ends of the plurality of heat exchange tubes 3 pass through the upper tube plate box 1, and the outlet ends of the plurality of heat exchange tubes 3 pass through the lower tube plate box 11. The shape of each of the upper tube plate box 1 and the lower tube plate box 11 is not limited, and can be a rectangular parallelepiped, a cube, or a cylinder, etc. The upper tube plate box 1 and the lower tube plate box 11 play a fixed support and sealing role for the heat exchange tubes 3. In one embodiment, the upper tube plate box 1 and the lower tube plate box 11 are rectangular parallelepipeds. The structures of the upper tube plate box 1 and the lower tube plate box 11 are the same, the connection manner of the upper tube plate box 1 and the plurality of heat exchange tubes 3 is the same as the connection manner of the lower tube plate box 11 and the plurality of heat exchange tubes 3, the sealing manner of the upper tube plate box 1 and the plurality of heat exchange tubes 3 is the same as the sealing manner of the lower tube plate box 11 and the plurality of heat exchange tubes 3. Therefore, in one embodiment, only the above upper tube plate box 1 is taken as an example for detailed description.

The material of the plurality of heat exchange tubes 3 is not limited, and can be various types of non-metal tubes such as glass tubes, metal tubes, and the like. The cross-sectional shape of the heat exchange tube 3 can be circular or non-circular, such as oval, drop shape, etc. The equivalent diameter of the heat exchange tube 3 is in a range from 0.2 mm to 200 mm. The arrangement of the heat exchange tubes 3 can be in-line or crossed, and the distance between two adjacent heat exchange tubes 3 is 0.8 to 3 times the equivalent diameter of the heat exchange tubes 3, but it is not limited to this. In one embodiment, the heat exchange tube 3 is a metal tube, the cross-sectional shape of the heat exchange tube 3 is circular, the diameter of the heat exchange tube 3 is 0.5 mm, and the heat exchange tubes 3 are parallel to each other. The heat exchange tubes 3 are normal pressure, slightly positive pressure or negative pressure pipes, and a plurality of heat exchange tubes 3 are positioned and fixed by the tube plates of the upper tube plate box 1 and the lower tube plate box 11.

The upper tube plate box 1 includes an upper tube plate 4, a lower tube plate 7 and a side plate 6. The upper tube plate 4, the lower tube plate 7, and the side plate 6 form a cavity. The upper tube plate 4 defines a plurality of opening, the lower tube plate 7 defines a plurality of opening, and the openings of the upper tube plate 4 and the openings of the lower tube plate 7 correspond one-to-one. There is a one-to-one relationship between the multiple heat exchange tubes 3 and the multiple openings. The upper tube plate 4, the lower tube plate 7, and the side plates 6 can be fixed by bolts, or the upper tube plate box 1 can be formed by 3D printing. The inlet end of the heat exchange tube 3 penetrates the corresponding openings of the upper tube plate 4 and the lower tube plate 7. The cavity of the upper tube plate box 1 is filled with elastic sealing rubber, and the heat exchange tube 3 is fixed in the cavity of the upper tube plate box 1 by the sealing rubber. Moreover, the sealing rubber is filled into the gap between the heat exchange tube 3 at the opening of the upper tube plate 4 and the upper tube plate 4, and the sealing rubber is also filled into the gap between the heat exchange tube 3 at the opening of the lower tube plate 7 and the lower tube plate 7, so that the heat exchange tube 3 is fixed and sealed with the upper tube plate 4 and the lower tube plate 7. In one embodiment, the fixing and sealing of the heat exchange tube 3 and the upper tube plate 4 are only realized by sealing rubber, the fixing and sealing of the heat exchange tube 3 and the lower tube plate 7 are only realized by sealing rubber, and other fixing and sealing methods are not included. The sealing rubber plays a role of sealing, flexible fixing, and restraint. The above-mentioned sealing rubber does not have a specific type, and can be selected and used according to the specific application environment of the tubular heat exchanger 10. Specifically, the sealing rubber may be a silicone rubber series, a polysulfide rubber series, a urethane rubber series, a diene rubber series, and the like.

The structure of the lower tube plate box 11 is the same as the structure of the upper tube plate box 1 and will not be repeated here.

In one embodiment, a pressure bolt 9 is provided on the side plate 6 of the upper tube plate box 1, and the pressure bolt 9 is perpendicular to the axial direction of the heat exchange tube 3. The pressure bolt 9 is used to apply and adjust the sealing pressure, so that a flexible connection mode between the heat exchange tube 3 and the tube plate is realized. Of course, the position where the pressure bolt 9 is set is not limited, and the pressure bolt 9 can also be set on the top or bottom plate of the upper tube plate box 1, as long as the sealing pressure can be applied and adjusted.

The tubular heat exchanger 10 further includes a connecting flange 8, the connecting flange 8 is connected to the tube plate box along the axial direction of the heat exchange tube 3, and is used to install the head box of the tubular heat exchanger 10.

The working temperature of the tubular heat exchanger 10 is not higher than the normal use temperature of the sealing rubber. Generally, the working temperature of the hot and cold fluid inside and outside of the tubular heat exchanger 10 is in a range from −70 degrees Celsius to 250 degrees Celsius, and the working pressure can be normal pressure, slightly positive pressure, or negative pressure.

In one embodiment, the fixing and sealing method of the heat exchange tube 3 and the upper tube plate 4 is only realized by sealing rubber, the fixing and sealing method of the heat exchange tube 3 and the lower tube plate 7 is only realized by sealing rubber, and other fixing and sealing methods are not included. Therefore, this connection method greatly reduces the requirements on the shape of the heat exchange tube 3. In addition, the diameter of the heat exchange tube 3 can be thinner, and the heat exchange tube 3 with an equivalent tube diameter of about 100 microns can be used, and the tube wall can be thinner, and a heat exchange tube 3 with a wall thickness of tens of microns can be used. The tubular heat exchanger 10 with thinner and thinner heat exchange tubes 3 has better heat dissipation effect.

When the areas of the upper tube plate 4 and the lower tube plate 7 are large, and the pressure in the cavity of the upper tube plate box 1 is high, the upper tube plate 4 and the lower tube plate 7 are likely to be deformed, thereby affecting the heat dissipation effect of the tubular heat exchanger 10. Therefore, along the axial direction of the heat exchange tube 3, a tie rod 2 is provided between the upper tube plate 4 and the lower tube plate 7, so that the upper tube plate 4 and the lower tube plate 7 are rigidly fixed. The two ends of the tie rod 2 are respectively fixed on the upper tube plate 4 and the lower tube plate 7, one end of the tie rod 2 is welded to the upper tube plate 4 or the lower tube plate 7, and the other end of the tie rod 2 is fixed to the lower tube plate 7 or the upper tube plate 4 by welding, screw connection or bolt-nut connection, thereby preventing the deformation of the upper tube plate 4 and the lower tube plate 7, maintaining the pressure in the cavity of the upper tube plate box 1, and increasing the rigidity of the upper tube plate box 1. The number of tie rods 2 and the distance between tie rods 2 can be calculated according to actual applications. Specifically, the tie rod 2 can be made of a metal material that is resistant to the corrosion of the sealing rubber. For example, the tie rod 2 can be made of iron, copper, aluminum, stainless steel, and so on. In one embodiment, the tie rod 2 can be an iron rod. It can be understood that the tube plate boxes 1, 11 and the tie rods 2 can also be integrally formed by mechanical cutting and welding processing, or 3D printing.

The two opposite ends of the heat exchange tube 3 respectively pass through the tube plates of the upper tube plate box 1 and the lower tube plate box 11, and are fixed and connected by sealing rubber and pressure bolts 9. The sizes of the tube plate boxes 1, 11 can be selected according to the number of the heat exchange tubes 3, and the tube diameter of the heat exchange tubes 3, and the distance between two adjacent heat exchange tubes 3. The tube plates on both sides of the tube plate box are fixed by the tie rods 2. Through the sealing rubber, pressure bolts 9, and tie rods 2 filled in the tube plate boxes 1, 11, a rigid and flexible connection between the tubes and the tube plate is realized.

In addition, the embodiment of the present application provides a packaging method of the tubular heat exchanger 10. Referring to FIG. 3. The packaging method of the tubular heat exchanger 10 includes the following steps:

S1, provide an upper tube plate box 1, a lower tube plate box 11, and a plurality of heat exchange tubes 3, wherein the upper tube plate box 1 defines multiple openings, the lower tube plate box 11 defines multiple openings, and the plurality of heat exchange tubes pass through the openings of the upper tube plate box 1 and the lower tube plate box 11;

S2, filling the upper tube plate box 1 and the lower tube plate box 11 with liquid sealing rubber, wherein the liquid sealing rubber is filled in the gap between the heat exchange tube 3 and the upper tube plate box 1, the liquid sealing rubber is also filled in the gap between the heat exchange tube 3 and the lower tube plate box 11, and then the liquid sealing rubber is solidified, so that multiple heat exchange tubes 3 are sealed and fixed in the upper tube plate box 1 and the lower tube plate box 11; and S3, installing the pressure bolts 9 on the upper tube plate box 1 and the lower tube plate box 11 to apply and adjust the sealing pressure.

During step S1, the upper tube plate box 1 includes an upper tube plate 4, a lower tube plate 7 and a side plate 6. The upper tube plate 4, the lower tube plate 7, and the side plate 6 form a cavity. The upper tube plate 4 defines a plurality of opening, the lower tube plate 7 defines a plurality of opening, and the openings of the upper tube plate 4 and the openings of the lower tube plate 7 correspond one-to-one. The upper tube plate 4, the lower tube plate 7, and the side plates 6 can be fixed by bolts, or the upper tube plate box 1 can be formed by mechanical cutting and welding processing or 3D printing. The structure of the lower tube plate box 11 is the same as the structure of the upper tube plate box 1 and will not be repeated here.

The material of the plurality of heat exchange tubes 3 is not limited, and can be various types of non-metal tubes such as glass tubes, metal tubes, and the like. The cross-sectional shape of the heat exchange tube 3 can be circular or non-circular, such as oval, drop shape, etc. The equivalent diameter of the heat exchange tube 3 is in a range from 0.2 mm to 200 mm. The arrangement of the heat exchange tubes 3 can be in-line or crossed, and the distance between two adjacent heat exchange tubes 3 is 0.8 to 3 times the equivalent diameter of the heat exchange tubes 3, but it is not limited to this. The heat exchange tubes 3 are normal pressure, slightly positive pressure or negative pressure pipes. The inlet ends of the plurality of heat exchange tubes 3 pass through the upper tube plate box 1, and the outlet ends of the plurality of heat exchange tubes 3 pass through the lower tube plate box 11. The heat exchange tubes 3 are positioned and fixed by the tube plates of the upper tube plate box 1 and the lower tube plate box 11. In one embodiment, the heat exchange tube 3 is a metal tube, the cross-sectional shape of the heat exchange tube 3 is circular, the diameter of the heat exchange tube 3 is 0.5 mm, and the heat exchange tubes 3 are parallel to each other.

During step 2, the upper tube plate box 1 and the lower tube plate box 11 are filled with the liquid sealing rubber. The liquid sealing rubber is filled in the gap formed between the heat exchange tube 3 and the upper tube plate box 1, the liquid sealing rubber is also filled in the gap formed between the heat exchange tube 3 and the lower tube plate box 11, and then the liquid sealing rubber is solidified, so that multiple heat exchange tubes 3 are sealed and fixed in the upper tube plate box 1 and the lower tube plate box 11. Since the liquid sealing rubber has good fluidity, as long as the filling amount is sufficient, the liquid sealing rubber can flow into the gap formed between the heat exchange tube 3 and the upper tube plate box 1, and the gap formed between the heat exchange tube 3 and the lower tube plate box 11. When the liquid sealing rubber is cured, the liquid sealing rubber solidifies into a solid sealing rubber and becomes an elastic body. The sealing rubber is filled into the gap between the heat exchange tube 3 at the opening of the upper tube plate 4 and the upper tube plate 4, and the sealing rubber is also filled into the gap between the heat exchange tube 3 at the opening of the lower tube plate 7 and the lower tube plate 7. There is no specific type of liquid sealing rubber, and the liquid sealing rubber can be selected and used according to the specific application environment of the tubular heat exchanger 10. The viscosity of the liquid sealing rubber ranges from 500 mpa·s to 100000 mpa·s. In one embodiment, the viscosity of the liquid sealing rubber ranges from 2000 mpa·s to 20000 mpa·s. Specifically, the liquid sealing rubber can be a silicone rubber series, a polysulfide rubber series, a urethane rubber series, a diene rubber series, and the like. In one embodiment, the liquid sealing rubber is a liquid silicone rubber series.

It is understandable that the sealing rubber can also be in granular or powder form before filling the upper tube plate box 1 and the lower tube plate box 11. When the granular or powdered sealing rubber is filled into the upper tube plate box 1 and the lower tube plate box 11, the granular or powdered sealing rubber must undergo high temperature to soften into fluid, and then the fluid is filled into the upper tube plate box 1 and the lower tube plate box 11.

During step 3, the pressure bolts 9 are installed on the upper tube plate box 1 and the lower tube plate box 11, and the sealing pressure is applied and adjusted by the pressure bolts 9 to realize the flexible connection between the heat exchange tube 3 and the tube plate. In one embodiment, the pressure bolts 9 are installed on the side plates 6 of the upper tube plate box 1 and the lower tube plate box 11, and the pressure bolts 9 are installed in a direction perpendicular to the heat exchange tube 3.

The upper tube plate box 1 and the lower tube plate box 11 are filled with sealing rubber. The sealing rubber can withstand high and low temperatures, has good elasticity and incompressibility, and has a wide operating temperature range. The sealing rubber is filled into the gap between the heat exchange tube 3 and the tube plate, and the sealing rubber plays a role of sealing and flexible fixing. When the pressure bolts 9 are installed in the upper tube plate box 1 and the lower tube plate box 11, due to the incompressibility of the sealing rubber, as soon as the sealing rubber is squeezed, the pressure rises, and the sealing rubber is squeezed into the gap between the heat exchange tube 3 and the openings of and the tube plate, so that the heat exchange tube 3 and the tube plate is sealed and fixed.

During step 1, when the areas of the upper tube plate box 1 and the lower tube plate box 11 are large, and the pressure in the cavity of the upper tube plate box 1 and the lower tube plate box 11 are high, the upper tube plates 4 and the lower tube plates 7 of the upper tube plate box 1 and the lower tube plate box 11 are likely to be deformed, which will affect the heat dissipation effect of the tubular heat exchanger 10. Therefore, along the axial direction of the heat exchange tube 3, a tie rod 2 is located between the upper tube plate 4 and the lower tube plate 7 to rigidly fix the upper tube plate 4 and the lower tube plate 7. The two opposite ends of the tie rod 2 are respectively fixed on the upper tube plate 4 and the lower tube plate 7. One end of the tie rod 2 is welded to the upper tube plate 4 or the lower tube plate 7, and the other end of the tie rod 2 is fixed to the lower tube plate 7 or the upper tube plate 4 by welding, screw connection or bolt-nut connection, thereby preventing the deformation of the upper tube plate 4 and the lower tube plate 7, maintaining the pressure in the cavities of the upper tube plate box 1 and the lower tube plate box 11, and increasing the rigidity of the upper tube plate box 1 and the lower tube plate box 11. The number of tie rods 2 and the distance between two adjacent tie rods 2 can be calculated according to actual applications. Specifically, the tie rod 2 can be made of a metal material that is resistant to the corrosion of the sealing rubber. For example, the tie rod 2 can be made of iron, copper, aluminum, stainless steel, and so on. It can be understood that the tube plate box 1, 11 and the tie rods 2 can also be integrally formed by mechanical cutting and welding processing, or 3D printing.

The packaging method of the tubular heat exchanger 10 in the embodiment of the present application changes the connection mode (welding, expansion joint, expansion welding combination, etc.) of the traditional tubular heat exchange and the tube plate. Through the elasticity, fluidity and incompressibility of the sealing rubber, the heat exchange tube 3 and the tube plates 4, 7 are sealed and fixed, and the flexible connection of the heat exchange tube 3 and the tube plates 4, 7 is realized. Therefore, the packaging method of the tubular heat exchanger 10 can quickly connect multiple heat exchange tubes 3 to the tube plates 4, 7. The packaging method is convenient to complete the connection and sealing of the heat exchange tube 3 and the tube plates 4, 7 at the same time, and is suitable for the processing technology of metal or non-metallic tubular heat exchanger. Therefore, the packaging method of the tubular heat exchanger 10 can complete the packaging at one time, which saves time and effort, can realize large-scale processing, and does not affect the use and lifespan of the tubular heat exchanger 10.

Moreover, since rubber is used to seal and fix the heat exchange tube 3 and the tube plates 4, 7, the requirements for the shape of the heat exchange tube 3 are greatly reduced, and the diameter and the tube wall of the heat exchange tube 3 can be thinner. The tubular heat exchanger 10 with thinner and thinner heat exchange tubes 3 has better heat dissipation effect.

When the areas of the upper tube plate box 1 and the lower tube plate box 11 are large, the tie rod 2 is set between the upper tube plates 4 and the lower tube plates 7 of the upper tube plate box 1 and the lower tube plate box 11 to rigidly fix the upper tube plate 4 and the lower tube plate 7, which can prevent the deformation of the upper tube plate 4 and the lower tube plate 7, maintain the pressure in the cavities of the upper tube plate box 1 and the lower tube plate box 11, and increase the rigidity of the upper tube plate box 1 and the lower tube plate box 11.

The packaging method of the tubular heat exchanger 10 of the present application is mainly aimed at the connection between the heat exchange tube 3 and the tube plates 4, 7, and is suitable for low-temperature flue gas waste heat recovery, sewage treatment and other fields. The material of the heat exchange tube 3 can be a metal tube or a non-metal tube. The pipe diameter has a wide variation range, and the heat exchange tube 3 can work under normal pressure, slightly positive pressure, or negative pressure.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A packaging method of a tubular heat exchanger, comprising:
   S1, arranging an upper tube plate box, a lower tube plate box, and a plurality of heat exchange tubes, wherein each of the upper tube plate box and the lower tube plate box defines a plurality of openings, and the plurality of heat exchange tubes extends through the plurality of openings;
   S2, filling the upper tube plate box and the lower tube plate box with a liquid sealing rubber, wherein the liquid sealing rubber is filled in a gap between the plurality of heat exchange tubes and the upper tube plate box, and a gap between the plurality of heat exchange tubes and the lower tube plate box; and curing the liquid sealing rubber, so that the plurality of heat exchange tubes is fixed in the upper tube plate box and the lower tube plate box; and
   S3, installing a pressure bolt on the upper tube plate box and the lower tube plate box to apply and adjust a sealing pressure.

2. The packaging method of claim 1, wherein in the step S1, each of the upper tube plate box and the lower tube plate box comprises an upper tube plate, a lower tube plate, and a side plate, the upper tube plate, the lower tube plate, and the side plates cooperatively form a cavity; and placing a tie rod between the upper tube plate and the lower tube plate along an axial direction of the plurality of heat exchange tubes.

3. The packaging method of claim 1, wherein two ends of the tie rod are respectively welded to the upper tube plate and the lower tube plate by a welding connection, a screw connection or a bolt-nut connection.

4. The packaging method of claim 1, wherein in the step S2, a viscosity of the liquid sealing rubber ranges from 500 mpa·s to 100000 mpa·s.

5. The packaging method of claim 1, wherein in the step S2, a viscosity of the liquid sealing rubber ranges from 2000 mpa·s to 20000 mpa·s.

6. The packaging method of claim 1, wherein each of the upper tube plate box and the lower tube plate box is formed by mechanical cutting and welding processing, or 3D printing.

* * * * *